United States Patent [19]

Bauer

[11] Patent Number: 5,558,295
[45] Date of Patent: Sep. 24, 1996

[54] SEAT BELT RETRACTOR WITH AUTOMATIC LOCKING MECHANISM

[75] Inventor: Barney J. Bauer, Fenton, Mich.

[73] Assignee: TRW Vehicle Safety Systems Inc., Lyndhurst, Ohio

[21] Appl. No.: 360,241

[22] Filed: Dec. 20, 1994

[51] Int. Cl.[6] .................................................. B60R 22/28
[52] U.S. Cl. ................................... 242/379.1; 280/805
[58] Field of Search ........................ 242/379.1, 384.5; 280/805, 806; 297/470, 471, 472; 188/375

[56] References Cited

U.S. PATENT DOCUMENTS

| | | |
|---|---|---|
| 4,273,361 | 7/1981 | Takei et al. . |
| 4,323,205 | 4/1982 | Tsuge et al. . |
| 5,234,181 | 8/1993 | Schroth . |
| 5,431,447 | 7/1995 | Bauer .......................... 188/375 X |

*Primary Examiner*—John M. Jillions
*Attorney, Agent, or Firm*—Tarolli, Sundheim, Covell, Tummino & Szabo

[57] ABSTRACT

A seat belt retractor (14) includes a spool (16) upon which vehicle seat belt webbing (12) is wound. The spool (16) is supported for unwinding rotation under the influence of tension in the webbing (12). An emergency locking mechanism (40) dissipates energy by resisting unwinding rotation of the spool (16), while permitting a limited amount of such rotation, when the level of the tension in the webbing (12) is greater than a predetermined elevated level. A sensor assembly (190) senses a vehicle occupant characteristic and/or a vehicle collision characteristic. A control assembly (180) varies the amount of dissipated energy in response to a signal from the sensor assembly (190).

15 Claims, 5 Drawing Sheets

SEAT BELT RETRACTOR WITH AUTOMATIC LOCKING MECHANISM

FIELD OF THE INVENTION

The present invention relates to a seat belt retractor, and particularly relates to a seat belt retractor having a locking mechanism.

BACKGROUND OF THE INVENTION

A seat belt system for restraining an occupant of a vehicle ordinarily includes seat belt webbing, a seat belt buckle, and a seat belt retractor. A locking tongue is connected to the webbing and is releasably lockable in the buckle when the webbing is extended around the vehicle occupant. The retractor includes a spool upon which the webbing is wound. The spool rotates in an unwinding direction when the vehicle occupant extracts the webbing from the retractor and moves the webbing toward the extended position in which the tongue is locked in the buckle. When the tongue is subsequently unlocked and released from the buckle, a rewind spring in the retractor rotates the spool in a winding direction to retract the webbing into the retractor.

When the vehicle experiences a collision, the vehicle decelerates and the vehicle occupant wearing the seat belt webbing moves forward against the webbing. The force which is then applied to the webbing urges the webbing to move outward from the retractor. Therefore, a seat belt retractor typically includes an emergency locking mechanism which blocks unwinding rotation of the spool in response to sudden vehicle deceleration and/or sudden extracting movement of the webbing. The emergency locking mechanism thus prevents the webbing from moving outward from the retractor when the vehicle experiences a collision. The webbing then restrains forward movement of the vehicle occupant. In a high energy collision, the tension in webbing may cause excessive loads to be imparted to the occupant. This may result from factors such as the weight of the occupant, the position of the occupant, and/or the energy of the collision.

SUMMARY OF THE INVENTION

In accordance with the present invention, an apparatus comprises a spool and a dissipator means. Seat belt webbing is wound on the spool, and the spool is supported for unwinding rotation under the influence of tension in the webbing. The dissipator means dissipates an amount of kinetic energy by resisting unwinding rotation of the spool, while permitting a limited amount of unwinding rotation of the spool, when the level of tension in the webbing is greater than a predetermined elevated level.

The apparatus further comprises sensor means and controller means. The sensor means senses a vehicle occupant characteristic and/or a vehicle collision characteristic, and provides at least one signal indicative of the sensed characteristic or characteristics. The controller means controls the dissipator means to vary the amount of dissipated kinetic energy in response to the signal or signals provided by the sensor means.

An apparatus constructed in accordance with the present invention dissipates energy that is transferred from the vehicle occupant to the spool through the tension in the seat belt webbing. As a result, the tension in the webbing, and hence the restraining force of the webbing, is reduced to a level that will not cause discomfort to the occupant.

In a preferred embodiment of the present invention, the dissipator means has a plurality of different conditions in which it provides respective different amounts of resistance to unwinding rotation of the spool. The controller means switches the dissipator means between the different conditions in response to the signal or signals provided by the sensor means. Specifically, the dissipator means has a finite number of such different conditions, and provides a respective predetermined amount of resistance to unwinding rotation of the spool when in each of the different conditions. Each of the predetermined amounts of resistance to unwinding rotation of the spool is an amount which results in dissipation of a corresponding amount of energy for the vehicle occupant characteristic and/or the vehicle collision characteristic sensed by the sensor means.

BRIEF DESCRIPTION OF THE DRAWINGS

Further features of the present invention will become apparent to those skilled in the art to which the present invention relates from reading the following description with reference to the accompanying drawings, in which.

DESCRIPTION OF A PREFERRED EMBODIMENT

Figure 1:
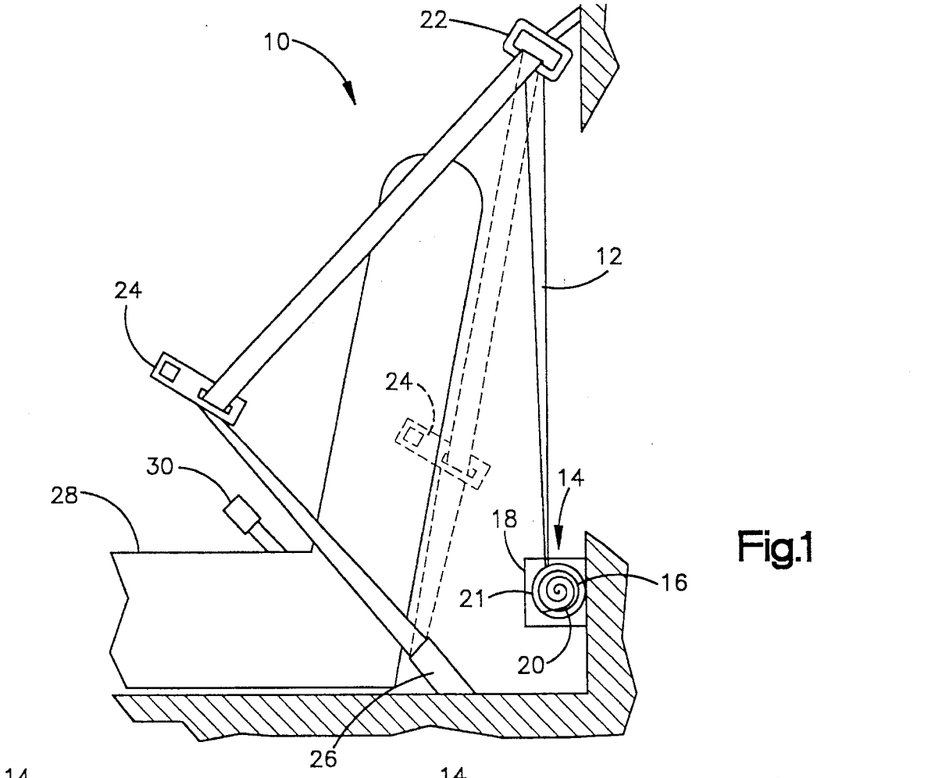
FIG. 1 is a schematic view of a vehicle occupant restraint apparatus comprising a preferred embodiment of the present invention.

A vehicle occupant restraint apparatus 10 comprising a preferred embodiment of the present invention is shown schematically in FIG. 1. The apparatus 10 is a seat belt system including seat belt webbing 12 and a seat belt retractor 14 for the webbing 12. The retractor 14 includes a spool 16 to which the webbing 12 is connected, and a frame 18 upon which the spool 16 is supported for rotation. A rewind spring 20 acts between the spool 16 and a spring cover 21 on the frame 18 so as to bias the spool 16 to rotate in a winding direction. The seat belt system 10 further includes a D-ring 22, a locking tongue 24 and an anchor 26. The webbing 12 extends from the retractor 14 to the anchor 26 through the D-ring 22 and the tongue 24.

The webbing 12 is movable back and forth between a fully retracted position and a fully extracted position upon winding and unwinding of the webbing 12 on the spool 16 in the retractor 14. When the webbing 12 is in the fully retracted position, it is fully wound onto the spool 16, and a portion of the webbing 12 is located on one side of an associated vehicle seat 28, as shown in dashed lines in FIG. 1. When the webbing 12 is in the fully extracted position, it is fully unwound from the spool 16, and is extracted from the retractor 14 sufficiently to enable the tongue 24 to reach a buckle 30 at the other side of the seat 28. The rewind spring 20 is stressed as the spool 16 rotates in an unwinding direction when a vehicle occupant extracts the webbing 12 from the retractor 14 and moves the tongue 24 toward the buckle 30. When the vehicle occupant releases the tongue 24 from the buckle 30, the rewind spring 20 rotates the spool 16 in the winding direction to retract the webbing 12 into the retractor 14, and thereby to move the webbing 12 back to the fully retracted position.

Figure 2:
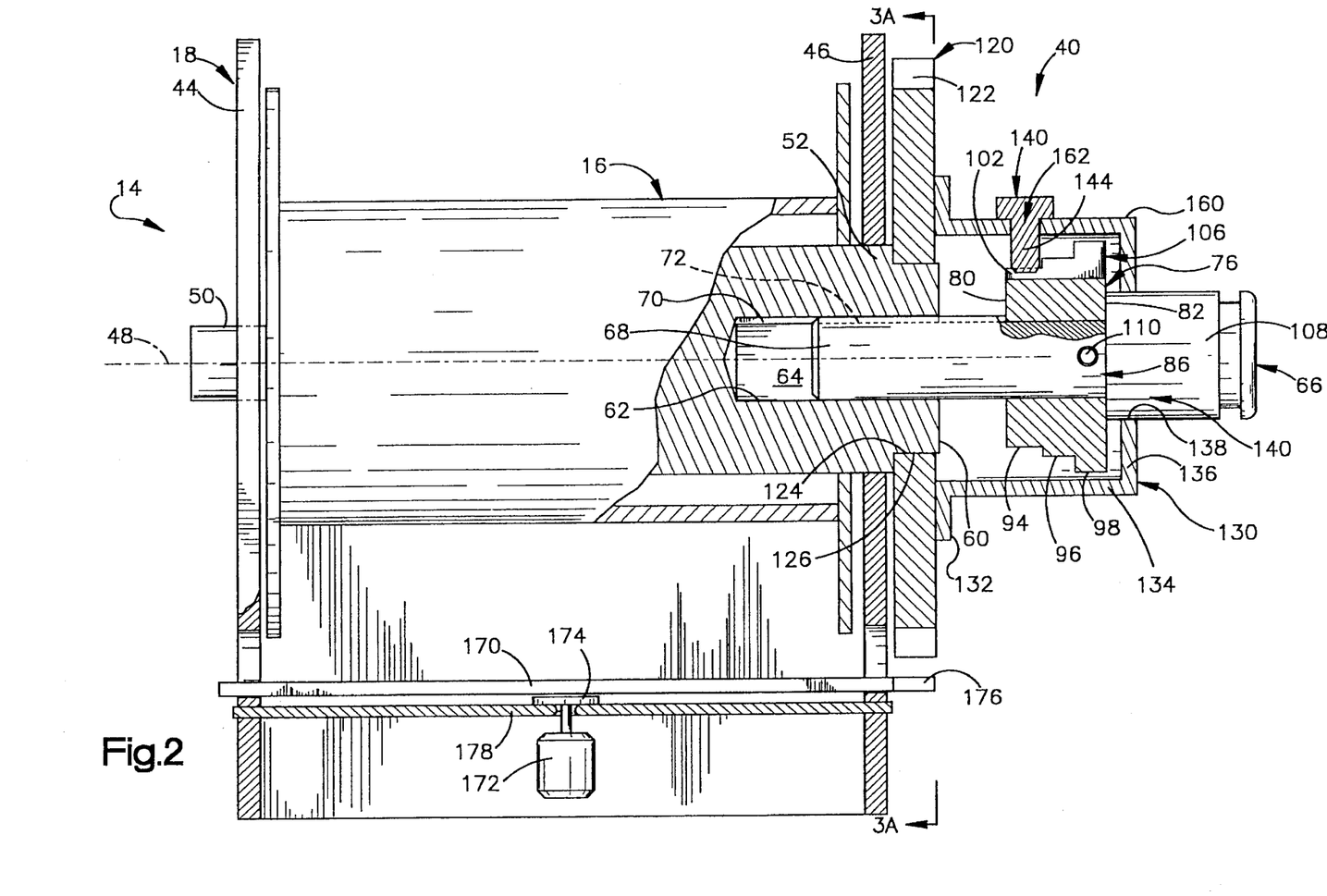
FIG. 2 is a view of parts of the apparatus of FIG. 1.

As shown in FIG. 2, the retractor 14 has an emergency locking mechanism 40. The emergency locking mechanism 40 operates to block unwinding rotation of the spool 16 in response to a vehicle condition indicating the occurrence of a vehicle collision. In the embodiment of the present invention shown in the drawings, the collision-indicating condition comprises a predetermined amount of vehicle deceleration. The emergency locking mechanism 40 thus prevents the webbing 12 from being further unwound from the spool 16 upon the occurrence of such vehicle deceleration. As a result, the webbing 12 restrains forward movement of an occupant of the seat 28 when the vehicle decelerates during a collision. However, forward movement of the occupant against the webbing 12 causes the webbing 12 to restrain the occupant with a restraining force which is directly related to the kinetic energy of the occupant. Therefore, the emergency locking mechanism 40 further operates (i) to allow the occupant to move as the occupant presses against the webbing 12, and (ii) to dissipate energy transferred into the webbing 12 as a function of the occupant's movement. Such operation of the emergency locking mechanism 40 is described fully below.

As shown in FIG. 2, the retractor frame 18 has first and second opposite side walls 44 and 46. The spool 16 has a longitudinal central axis 48, and further has first and second concentric shaft portions 50 and 52 which are supported by the first and second side walls 44 and 46, respectively, for rotation about the axis 48. The spool 16 is thus supported by the frame 18 for rotation about the axis 48 in the winding direction, which clockwise as viewed in FIGS. 3A and 3B, and in the unwinding direction, which is counterclockwise as viewed in FIGS. 3A and 3B. The rewind spring 20 (FIG. 1) acts between the spring cover 21 and the first shaft portion 50 of the spool 16 in a known manner to bias the spool 16 in the winding directing. The emergency locking mechanism 40 acts between the frame 18 and the second shaft portion 52 of the spool 16.

The second shaft portion 52 of the spool 16 has an annular outer end surface 60 and a cylindrical inner surface 62. The inner surface 62 defines a bore 64 extending axially inward from the outer end surface 60. A control shaft 66 has an elongated cylindrical body portion 68 which is closely received in the bore 64 for sliding movement along the axis 48 relative to the spool 16. A spline 70 in the bore 64 is received in a groove defined by a recessed surface 72 of the control shaft 66. The spline 70 blocks rotation of the control shaft 66 about the axis 48 relative to the spool 16.

Figure 6:
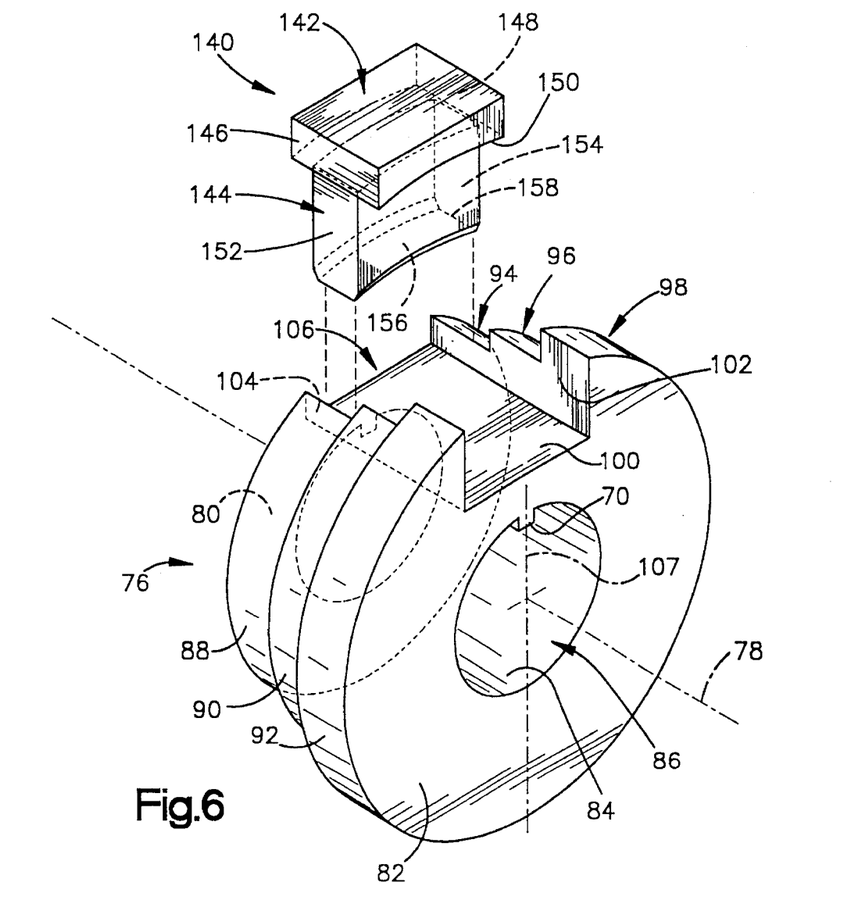
FIG. 6 is an enlarged exploded view of parts shown in FIG. 2.

A slotted wheel 76 is supported on the control shaft 66. As best shown in FIG. 6, the slotted wheel 76 has a central axis 78 and first and second axially opposite end surfaces 80 and 82 which are perpendicular to the axis 78. A cylindrical inner surface 84 of the slotted wheel 76 defines a bore 86 extending axially between the opposite end surfaces 80 and 82. The slotted wheel 76 further has first, second, and third cylindrical outer surfaces 88, 90, and 92, with the second cylindrical outer surface 90 being located between the first and third cylindrical outer surfaces 88 and 92. The diameter of the second cylindrical outer surface 90 is greater than the diameter of the first cylindrical outer surface 88. The diameter of the third cylindrical outer surface 92 is greater than the diameter of the second cylindrical outer surface 90. The first, second, and third cylindrical outer surfaces 88, 90, and 92 thus define first, second, and third cylindrical sections 94, 96, and 98 of the slotted wheel 76 which have differing diameters.

The slotted wheel 76 further has three planar surfaces 100, 102, and 104. The three planar surfaces 100, 102 and 104 define a slot 106 which extends longitudinally between the opposite end surfaces 80 and 82. One planar surface 100 lies in a plane that is perpendicular to a diametrical line 107, and is recessed radially from the cylindrical outer surfaces 88, 90, and 92. The other two planar surfaces 102 and 104 extend inward from the cylindrical outer surfaces 88, 90, and 92 to the recessed planar surface 100, and thus define the depth of the slot 106. Accordingly, the depth of the slot 106 is greater at the second cylindrical section 96 than at the first cylindrical section 94, and is likewise greater at the third cylindrical section 98 than at the second cylindrical section 96.

Figure 4:
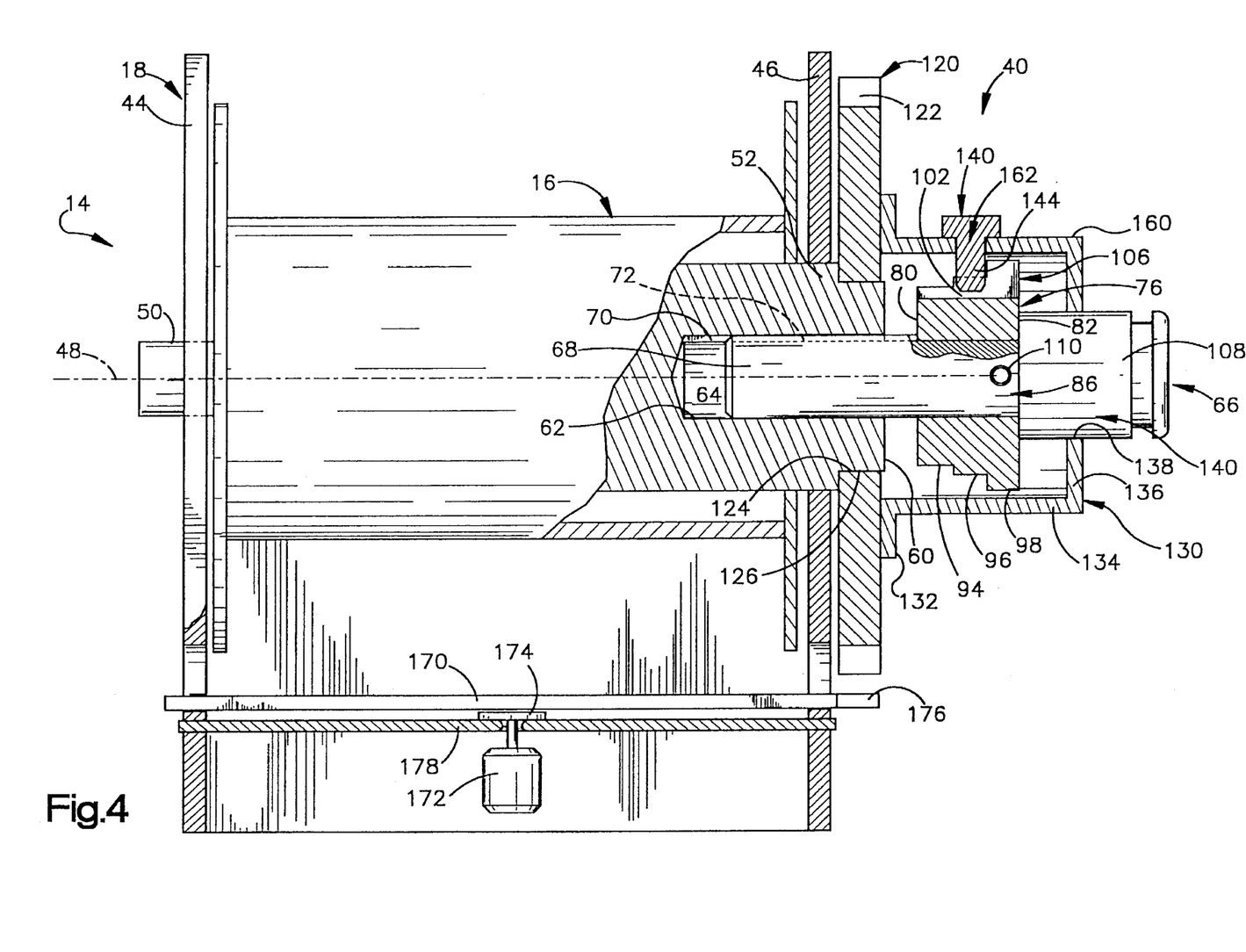
FIGS. 4 and 5 are views similar to FIG. 2 showing parts in different positions.
Figure 5:
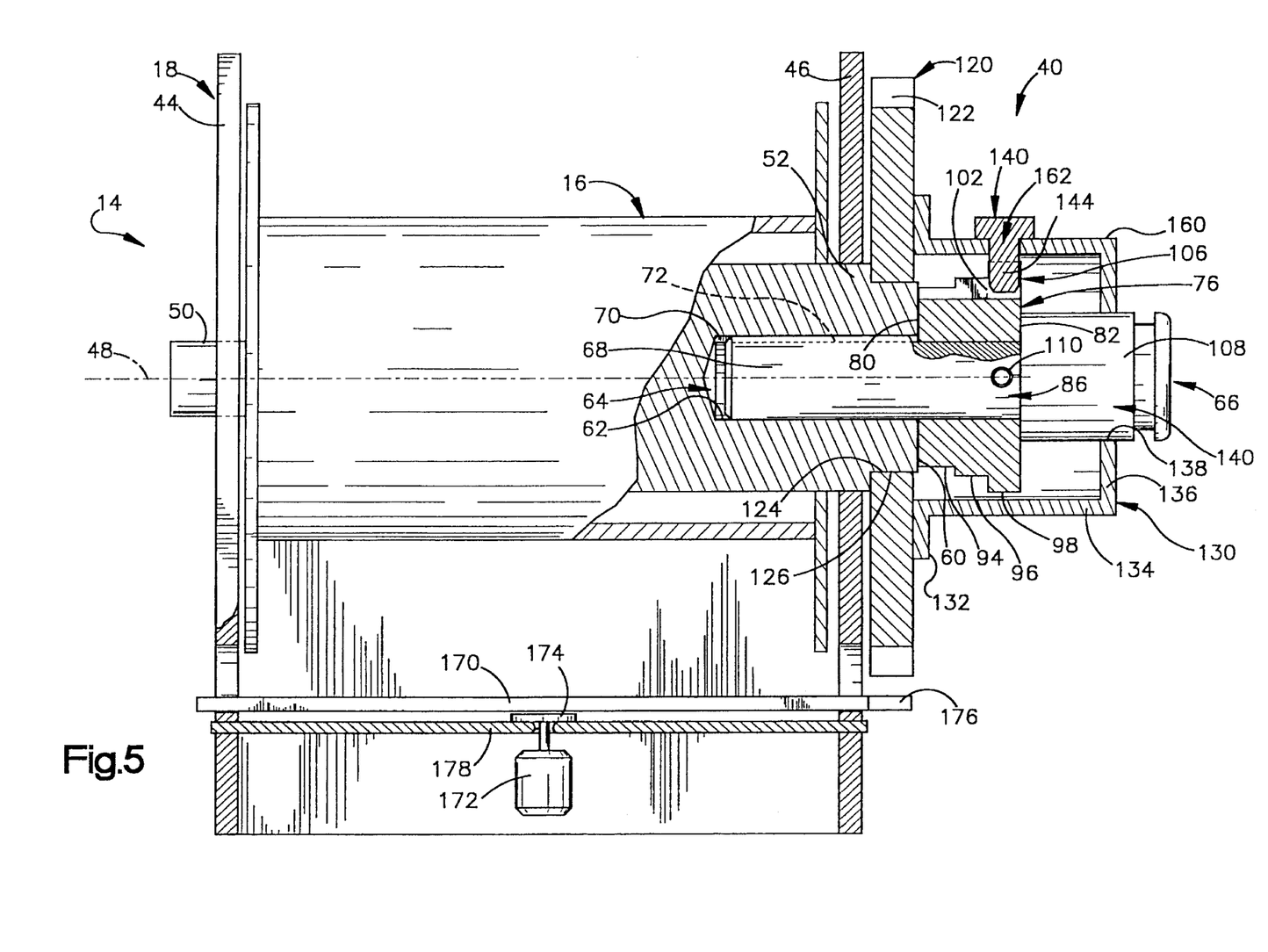

With further reference to FIG. 2, the body portion 68 of the control shaft 66 is closely received through the bore 86 in the slotted wheel 76. An enlarged cylindrical head portion 108 of the control shaft 66 abuts the slotted wheel 76 at the second end surface 82. A radially extending pin 110 blocks rotational and axial movement of the slotted wheel 76 relative to the control shaft 66. The pin 110 thus supports the slotted wheel 76 on the control shaft 66 for rotation about the axis 48 with the spool 16 and the control shaft 66, and for movement along the axis 48 relative to the spool 16 with the control shaft 66. The slotted wheel 76 and the control shaft 66 are movable axially together between the positions in which they are shown in FIGS. 2, 4 and 5.

A ratchet wheel 120 also is supported on the second shaft portion 52 of the spool 16. The ratchet wheel 120 has a plurality of ratchet teeth 122 at its periphery, and has an annular inner surface 124 received coaxially over an annular outer surface 126 of the second shaft portion 52. The annular inner surface 124 fits closely over the annular outer surface 126, but is free to slide circumferentially around the annular outer surface 126. The ratchet wheel 120 is thus supported on the spool 16 for rotation about the axis 48 relative to the spool 16.

A cup-shaped cap 130 is supported on the ratchet wheel 120. The cap 130 has a circular flange 132, and has a cylindrical body wall 134 extending axially from the flange 132 to a circular end wall 136. The flange 132 is fixed to the ratchet wheel 120 by any suitable means known in the art, such as by a weld. The cap 130 is thus supported to rotate with the ratchet wheel 120 about the axis 48. An annular inner edge surface 138 of the end wall 136 defines an opening 140 centered on the axis 48. The head portion 108 of the control shaft 66 extends through the opening 140, and is movable in the opening 140 both rotationally and axially relative to the cap 130.

As best shown in FIG. 6, a cutter 140 has a base 142 and a blade 144. The base 142 of the cutter 140 is rectangular with first and second opposite end surfaces 146 and 148, and has a bottom surface 150 with an arcuate contour. The blade 144 projects from the bottom surface 150 of the base 142, and also has first and second opposite end surfaces 152 and 154. A bottom surface 156 of the blade 144 extends between the opposite end surfaces 152 and 154, has an arcuate contour similar to that of the bottom surface 150 of the base 142. A cutting edge 158 extends across the blade 144 at the juncture of the bottom surface 156 and the second end surface 154.

As further shown in FIG. 2, the body wall 134 of the cap 130 has a cylindrical outer surface 160, and has an inner edge surface defining a slot 162. The slot 162 extends radially through the body wall 134 and is elongated circumferentially relative to the body wall 134. The cutter 140 is fixed to the cup 130, such as by a weld, with the arcuate lower side surface 150 of the base 142 overlying the cylindrical outer surface 160 of the body wall 134, and with the blade 144 extending radially inward through the slot 162. The blade 144 further extends radially into the slot 106 in the slotted wheel 76. The cutting edge 158 (FIG. 6) on the blade 144 faces toward the planar surface 102 in the slot 106.

When the spool 16 rotates about the axis 48 in the winding and unwinding directions upon retraction and extraction of the webbing 12, as described above, the control shaft 66 and the slotted wheel 76 are rotated with the spool 16 by the rotational driving connections established by the spline 70 and the pin 110, respectively. Depending upon the direction of rotation of the spool 16, either of the planar surfaces 102 and 104 of the slotted wheel 76 is then moved circumferentially against the blade 144 in the slot 106. The slotted wheel 76 is thus pressed against the cutter 140 so as to rotate the cutter 140, the cup 130, and the ratchet wheel 120 about the axis 48 with the spool 16. A rotational driving connection is thus established between the spool 16 and the ratchet wheel 120 so that the ratchet wheel 120 will normally rotate about the axis 48 with the spool 16 in the winding and unwinding directions when the webbing 12 is extracted and retracted by the vehicle occupant.

Figure 3A:
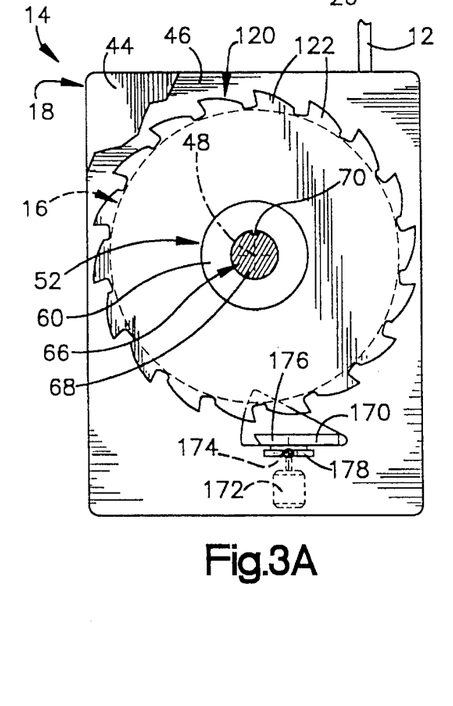
FIG. 3A is a view taken on line 3A—3A of FIG. 2.
Figure 3B:
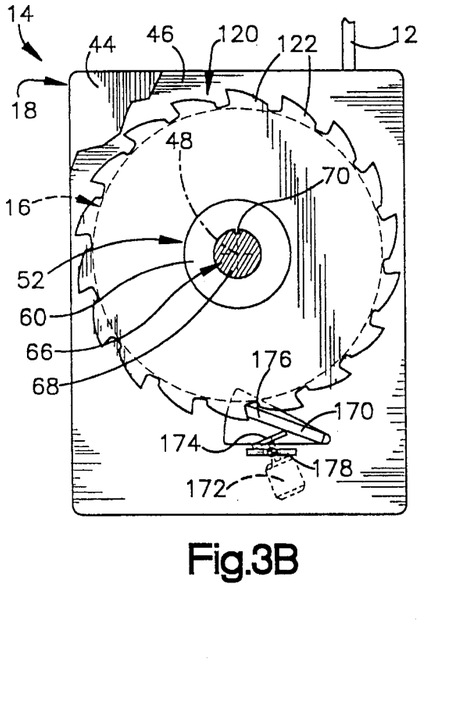
FIG. 3B is a view similar to FIG. 3A showing parts in different positions.

The emergency locking mechanism 40 further includes a locking pawl 170, an inertia member 172, and a lever 174. The locking pawl 170 extends across the frame 18 between the side walls 44 and 46, and is supported by the side walls 44 and 46 for pivotal movement between a non-locking position and a locking position. When the locking pawl 170 is in the non-locking position, as shown in FIG. 3A, it is spaced from the ratchet teeth 122 on the ratchet wheel 120. When the locking pawl 170 is in the locking position, as shown in FIG. 3B, an end portion 176 of the locking pawl 170 extends into the path of movement of the ratchet teeth 122 to block rotation of the ratchet wheel 120 in the unwinding direction.

The inertia member 172 and the lever 174 are supported for pivotal movement on a cross bar 178 extending between the side walls 44 and 46 of the frame 18. When the vehicle experiences the predetermined amount of deceleration, the inertia member 172 and the lever 174 pivot on the cross bar 178 from the positions shown in FIG. 3A to the positions shown in FIG. 3B. When the lever 174 pivots to the position of FIG. 3B, it moves against the locking pawl 170 to pivot the locking pawl 170 to the locking position. The ratchet wheel 120 is thus prevented from rotating in the unwinding direction upon the occurrence of vehicle deceleration indicative of a collision.

Alternatively, the emergency locking mechanism 40 could have parts that block unwinding rotation of the ratchet wheel 120 in response to a different condition. Such a different condition could comprise, for example, a predetermined amount of sudden unwinding rotation of the spool which occurs when an occupant of the seat 28 moves against the webbing 12 during a collision. In any case, the emergency locking mechanism 40 blocks unwinding rotation of the ratchet wheel 120 in response to the collision-indicating condition.

When the ratchet wheel 120 is blocked from rotating in the unwinding direction in the foregoing manner, the spool 16 is urged to rotate in the unwinding direction relative to the ratchet wheel 120. Specifically, the spool 16 is urged to rotate in the unwinding direction relative to the ratchet wheel 120 by a rotational force that is applied to the spool 16 by the webbing 12 when the occupant of the seat 28 moves forward against the webbing 12 upon deceleration of the vehicle. That rotational force is directly related to the tension in the webbing 12 which, in turn, is directly related to the kinetic energy of the occupant moving forward against the webbing 12.

The control shaft 66 and the slotted wheel 76, which are constrained to rotate with the spool 16 as described above, are likewise subjected to a rotational force which is directly related to the tension in the webbing 12. The planar surface 102 of the slotted wheel 76 is thus pressed against the blade 144 on the cutter 140 with a rotational force that is directly related to the tension in the webbing 12. If the level of the tension in the webbing 12 is less than a predetermined elevated level, the cutter 140 will block rotation of the slotted wheel 76. This is because the cutter 140, the cup 130, and the ratchet wheel 120 are blocked from rotational movement by the locking pawl 170, as described above. The spool 16 will then be prevented from rotating in the unwinding direction and the webbing 12 will restrain forward movement of the occupant.

If the kinetic energy of the occupant is great enough to cause the tension in the webbing 12 to rise above the predetermined elevated level, the planar surface 102 of the slotted wheel 76 will be pressed against the cutting edge 158 forcefully enough to cause the blade 144 to cut into the slotted wheel 76 at the planar surface 102. The slotted wheel 76, and hence the spool 16, will then rotate a slight amount in the unwinding direction as the blade 144 cuts into the slotted wheel 76. As a result of such cutting, the webbing 12 permits the vehicle occupant to move forward a slight amount. Moreover, the blade 144 will cut into the slotted wheel 76 in an amount which is directly related to the level of tension in the webbing 12. The blade 144 will thus cut into the slotted wheel 76 in an amount which is directly related to the kinetic energy of the occupant. Therefore, as an additional result, such cutting dissipates kinetic energy of the occupant.

More specifically, the rotational force pressing the slotted wheel 76 against the blade 144 acts through the stroke of the blade 144 cutting into the slotted wheel 76. A force thus acts through a distance. Therefore, work is performed and energy is dissipated. The amount of energy that is dissipated is determined by the level of the force and the distance through which it acts. The amount of energy that is dissipated by the emergency locking mechanism 40 is thus determined by the level of the tension in the webbing 12 and by the cutting stroke of the blade 144. For a given level of tension in the webbing 12, the cutting stroke of the blade 144 will depend on the resistance to cutting that is provided by the slotted wheel 76. Accordingly, the amount of kinetic energy of the vehicle occupant to be dissipated by the emergency locking mechanism 40 upon the occurrence of a vehicle collision will depend on the degree to which the slotted wheel 76 resists being cut by the blade 144 as the slotted wheel 76 rotates relative to the cutter 140.

When the slotted wheel 76 is in the position shown in FIG. 2, the first section 94 of the slotted wheel 76 is located adjacent to the blade 144 on the cutter 140. When the blade 144 cuts into the first section 94 upon rotation of the slotted wheel 76 relative to the cutter 140, the slotted wheel 76 provides a first predetermined amount of resistance to such cutting. That amount of resistance is determined by the amount of the material of the slotted wheel 76 that extends radially into the path of relative rotational movement of the cutter 140, i.e., the amount of material that is located between the cutting edge 158 and the first cylindrical outer surface 88 as a result of the diameter of the first section 94 of the slotted wheel 76. That amount of material defines the thickness of a circumferentially extending strip which is cut away from the first section 94 upon rotation of the slotted wheel 76 relative to the cutter 140.

When the slotted wheel 76 is in the position shown in FIG. 4, the second section 96 of the slotted wheel 76 is located adjacent to the blade 144 on the cutter 140. The slotted wheel 76 then provides a second predetermined amount of resistance to cutting by the blade 144 in a similar manner. Since the diameter of the second section 96, and hence the cut depth, is greater than the diameter of the first section 94, the second predetermined amount of resistance is correspondingly greater than the first predetermined amount of resistance. Likewise, when the slotted wheel 76 is in the position shown in FIG. 5, the third section 98 of the slotted wheel 76 is located adjacent to the blade 144. A third, greatest predetermined amount of resistance to cutting is provided accordingly. In the preferred embodiment of the present invention shown in the drawings, the resistance to cutting provided by the third section 98 of the slotted wheel 76 is great enough to prevent such cutting, and is thus great enough to prevent rotation of the slotted wheel 76 relative to the cutter 140.

The retractor 14 further includes a control assembly 180 for controlling the amount of occupant movement that is permitted, and also the amount of kinetic energy that is dissipated, by the emergency locking mechanism 40. As shown schematically in FIG. 7, the control assembly 180 includes an electric motor 182 and a controller 184. The controller 184 may comprise any suitable microprocessor known in the art. The motor 182 has an output shaft 186. The output shaft 186 is coupled with the control shaft 66 by a suitable coupling 188 so as to impart axial movement to the control shaft 66 when the motor 182 is actuated by the controller 184. The motor 182 can thus move the control shaft 66, and hence the slotted wheel 76, axially between the positions in which they are shown in FIGS. 2, 4 and 5.

Figure 7:
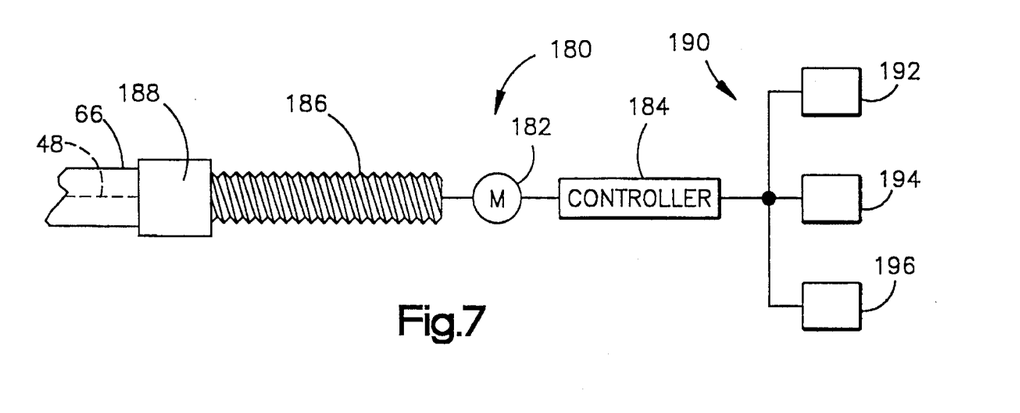
FIG. 7 is a schematic view showing other parts of the apparatus of FIG. 1.

As further shown in FIG. 7, the controller 184 actuates the motor 182 in response to a sensor assembly 190. The sensor assembly 190 includes a first sensor 192 which senses a characteristic of the occupant of the seat 28 (FIG. 1), and which provides a signal indicative of the sensed characteristic. The first sensor 192 may be any suitable sensor known in the art. The controller 184 directs the motor 182 to move the control shaft 66 and the slotted wheel 76 between the positions of FIGS. 2, 4 and 5 in response to the signal indicating the characteristic sensed by the first sensor 192. For example, if the first sensor 192 senses the weight of the occupant, the motor 182 will move the control shaft 66 and the slotted wheel 76 to the positions of FIG. 2 when the sensed weight of the occupant is within a relatively low range. The motor 182 will move the control shaft 66 and the slotted wheel 76 to the positions of FIG. 4 when the sensed weight is within an intermediate range, and to the positions of FIG. 5 when the sensed weight is in a relatively high range. The amount of occupant movement to be permitted, and the amount of kinetic energy to be dissipated, by the emergency locking mechanism 40 will be predetermined accordingly. The control assembly 180 thus ensures that the slotted wheel 76 will be located in a position to permit a predetermined amount of occupant movement, and to dissipate a predetermined amount of kinetic energy, upon the occurrence of a vehicle collision by moving the slotted wheel 76 to such a position before the occurrence of a vehicle collision.

The sensor assembly 190 preferably includes a second sensor 194 for sensing an additional characteristic of the vehicle occupant, such as a positional characteristic of the occupant, as well as a third sensor 196 for sensing a condition of the vehicle which indicates the severity of a vehicle collision. The controller 184 interprets the characteristics sensed by all three sensors 192, 194 and 196, and directs the motor 182 to move the control shaft 66 and the slotted wheel 76 to a position which is predetermined accordingly. Additional and/or different sensors could be used in a similar manner, as desired.

From the above description of the invention, those skilled in the art will perceive improvements, changes and modifications. For example, a pyrotechnic actuator with a piston or a solenoid could be used in place of the motor 182 with the output shaft 184. Such improvements, changes and modifications within the skill of the art are intended to be covered by the appended claims.

Having described the invention, the following is claimed:

1. Apparatus comprising:

a spool upon which vehicle seat belt webbing is wound, said spool being supported for unwinding rotation under the influence of tension in said webbing;

dissipator means for dissipating an amount of energy by resisting said unwinding rotation of said spool, while permitting a limited amount of said unwinding rotation, when the level of said tension is greater than a predetermined elevated level;

sensor means for sensing at least one characteristic selected from a vehicle occupant characteristic and a vehicle collision characteristic and for providing at least one signal indicative of said at least one characteristic; and controller means for controlling said dissipator means to vary said amount of dissipated energy in response to said at least one signal.

2. Apparatus as defined in claim 1 wherein said dissipator means has a plurality of different conditions in which said dissipator means provides respective different amounts of resistance to said unwinding rotation of said spool, said controller means including means for switching said dissipator means between said conditions in response to said at least one signal.

3. Apparatus as defined in claim 2 wherein said dissipator means has a finite number of said conditions and provides a respective predetermined different amount of resistance to said unwinding rotation of said spool when in each of said conditions.

4. Apparatus as defined in claim 3 wherein said controller means switches said dissipator means between said conditions before the occurrence of a vehicle collision.

5. Apparatus as defined in claim 1 wherein said dissipator means includes first and second dissipator members, said first dissipator member having means for cutting into said second dissipator member under the influence of said tension when the level of said tension is greater than said predetermined elevated level.

6. Apparatus as defined in claim 5 wherein said dissipator members are supported for rotation relative to each other under the influence of said tension when the level of said tension is greater than said predetermined elevated level, said cutting means cutting into said second dissipator member upon said rotation of said dissipator members relative to each other.

7. Apparatus as defined in claim 6 wherein said dissipator members are supported to rotate together under the influence of said tension when said tension is less than said predetermined elevated level, said apparatus further comprising means for blocking rotation of one of said dissipator members in response to a condition indicating the occurrence of a vehicle collision.

8. Apparatus as defined in claim 7 wherein said controller means moves said dissipator members relative to each other between a plurality of different orientations in response to said at least one signal, said second dissipator member providing a respective different resistance to said cutting when said dissipator members are in each of said different orientations.

9. Apparatus comprising:
a spool upon which vehicle seat belt webbing is wound, said spool being supported for unwinding rotation under the influence of tension in said webbing;
first and second rotatable members supported for rotation under the influence of said tension;
means for causing said rotatable members to rotate relative to each other under the influence of said tension when the level of said tension is greater than a predetermined elevated level;
dissipator means for dissipating energy by resisting said rotation of said rotatable members relative to each other; and
controller means for moving said first rotatable member relative to said second rotatable member between a plurality of different positions, said dissipator means providing a respective different resistance to said rotation of said rotatable members relative to each other when said first rotatable member is in each of said different positions.

10. Apparatus as defined in claim 9 wherein said dissipator means includes cutter means on one of said rotatable members for cutting into the other of said rotatable members when said rotatable members rotate relative to each other under the influence of said tension.

11. Apparatus as defined in claim 9 further comprising means for transmitting the force of said tension from said spool to said first rotatable member to rotate said first rotatable member with said spool, said first rotatable member having an axis of rotation, said different positions having respectively different locations along said axis.

12. Apparatus as defined in claim 11 wherein said first rotatable member extends radially into the relative rotational path of movement of said second rotatable member in a respectively different amount to resist relative rotation of said second rotatable member in a respectively different amount when in each of said different positions.

13. Apparatus as defined in claim 12 wherein said first rotatable member has a finite number of axially distinct sections, each of said sections extending radially into said relative rotational path of movement of said second rotatable member in a respective predetermined amount when said first rotatable member is in a respective one of said different positions.

14. Apparatus as defined in claim 13 wherein said dissipator means includes cutter means on said second rotatable member for cutting into said first rotatable member when said rotatable members rotate relative to each other under the influence of said tension, each of said sections of said first rotatable member extending radially into the relative rotational path of movement of said cutter means in a respective one of said predetermined amounts when said first rotatable member is in a respective one of said different positions.

15. Apparatus as defined in claim 14 wherein said first rotatable member has means for defining a slot extending axially between said sections, said cutter means comprising a blade extending radially into said slot, said first rotatable member being movable axially relative to said blade between said different positions.

* * * * *